United States Patent
Abramowicz et al.

(10) Patent No.: US 6,215,947 B1
(45) Date of Patent: Apr. 10, 2001

(54) FLEXIBLE LIGHT PIPE FOR SIDE-LIT APPLICATIONS

(75) Inventors: Mark A. Abramowicz, Streetsboro, OH (US); Jeffrey L. Daecher, Sicklerville, NJ (US); Michael P. Hallden-Abberton, Maple Glen, PA (US)

(73) Assignee: Fiberstars Incorporated, Solon, OH (US)

( * ) Notice: Subject to any disclaimer, the term of this patent is extended or adjusted under 35 U.S.C. 154(b) by 0 days.

(21) Appl. No.: 09/552,482

(22) Filed: Apr. 18, 2000

Related U.S. Application Data

(63) Continuation of application No. 08/974,766, filed on Nov. 20, 1997, now Pat. No. 6,091,878.

(51) Int. Cl.$^7$ .................................................. G02B 6/00
(52) U.S. Cl. ..................... 385/143; 385/901; 385/128; 385/145; 362/559; 362/551
(58) Field of Search .................................. 385/128, 143, 385/145, 141, 901; 362/551, 559

(56) References Cited

U.S. PATENT DOCUMENTS

| | | |
|---|---|---|
| 4,828,359 | 5/1989 | Ueba et al. . |
| 5,616,638 | 4/1997 | Hallden-Aberton et al. . |
| 6,123,442 * | 9/2000 | Freier et al. ..................... 362/559 |

FOREIGN PATENT DOCUMENTS 0 629 493 A1   12/1994   (EP) .

OTHER PUBLICATIONS

OptiFlex (TM) Flexible Light Pipe Side Light Data Sheet, Publication No. OF46113M97, Rohm & Haas, 1997.

* cited by examiner

*Primary Examiner*—Hung N. Ngo
(74) *Attorney, Agent, or Firm*—Charles E. Bruzga

(57) ABSTRACT

An improved optical light pipe for side-lit uses is formed from a core/cladding combination, optionally with a transparent jacket, where the core is preferably a cured acrylic polymer and the cladding is preferably a fluorocarbon polymer containing a very low level of fine particles which scatter the light uniformly along the length of the piping. Further light enhancement can be obtained with low levels of glass fibers or glass microspheres also present in the cladding. Chopped glass fibers alone at low levels in the cladding are useful for back-lit applications. The light pipe so formed is useful in signs, underwater outlines, corridor lighting in theaters, and similar uses.

8 Claims, No Drawings

FLEXIBLE LIGHT PIPE FOR SIDE-LIT APPLICATIONS

This application is a continuation of the U.S. patent application Ser. No. 08/974,766, filed on Nov. 20, 1997, now U.S. Pat. No. 6,091,878.

This invention relates to an improved composition for cladding and sheathing a flexible light-conducting core to form a flexible light pipe ("FLP") having improved side-lighting performance, and the improved side-lighting FLP composition which results.

U.S. Pat. Nos. 5,406,641 and 5,485,541, both herein incorporated by reference, teach a process for preparing a flexible light pipe, preferably from a crosslinked poly(alkyl acrylate) core, which core is enclosed in a polymeric cladding and further protected by a polymeric sheathing. These applications teach a variety of cladding materials with refractive indices lower than the polyacrylate core, preferring fluorinated polymers and teaching or exemplifying terpolymers of perfluoroalkyl vinyl ether/ tetrafluoroethylene/hexafluoropropylene (FEP) and of vinylidene fluoride/ tetrafluoroethylene/ hexafluoropropylene (THV). THV has advantages in highly flexible applications, but is somewhat harder to process when curing is desired than FEP. These cited applications further teach a number of polymers useful as sheathing, such as polyethylene, linear low density polyethylene, polypropylene, and polystyrene.

The major use for such lighting has been in end-lit applications, where it is desired to conduct the light effectively and with few losses from the source to the desired area of illumination. However, a second area of use exists where the light is allowed to issue as uniformly as possible from the side or walls of the light pipe. The side-light emitting flexible pipe has many potential uses, such as advertising signs, exit path illuminators, swimming pool surrounds, entertainment and amusement uses, architectural uses, and the like, where the combination of flexibility, decoupling from the light source for safety reasons, ability to use various colors, ability to produce even illumination, and the like produce advantages over neon tubing or over rigid plastic pipe or fibers.

Robbins et al., U.S. Pat. No. 5,067,831, describe the general concept of a core/fluoropolymer clad/transparent or translucent sheath composite for use in side-lighting applications. However, Robbins relies on the leakage of light from the clad combined with the passage and issuance of light through the transparent or translucent sheath to produce his side-lighting effects. He does not teach or suggest altering the nature of the clad material to enhance the amount of light issued from the composite.

Japanese Kokai JP 08-094862-A teaches an optical waveguide tube with good optical transmission comprising a transparent core and a fluororubber cladding which contains a trapping agent for a halogen compound, which remains in the clad, such as activated carbon, silica, silica gel, alumina, or molecular sieves, a zeolite-based adsorbent, an ion exchange resin, magnesium oxide(which has a high reactivity toward halogen), calcium carbonate, or silver sulfate. However, the transparent core is a silicone liquid, which is far less useful for a flexible light pipe in terms of avoidance of kinking and in handling and installation than a solid flexible polymer. Further, the particles are present in the clad purely to stabilize the clad against decreases in transmission due to the halogen compounds, and at amounts significantly higher than the optimum level for effective light enhancement, so that they would contribute opacity. Kokai JP 08-094862 neither teaches or suggests the use of selected particulate addition to the clad to enhance the side-lighting capabilities of the composite.

Orcutt, U.S. Pat. No. 4,422,719 teaches a transparent semi-solid core with a clad or sleeve which is designed to transmit light from the core as it travels the length of the pipe. Orcutt teaches the use of titanium dioxide ($TiO_2$) but at high levels of 2 to 10%, which will produce a light pipe which, although not totally opaque, will not pass through enough of the light introduced by the illuminator to give the brilliant illumination desired.

Thus, the need still exists for an improved flexible light pipe which delivers light from the side in a uniform manner along the length of the pipe, and which uses the delivered light effectively so as to give optimum illumination effects from the specific light intensity supplied at one or both ends of the flexible light pipe. More specifically, we have discovered an improved process for producing light pipe suitable for side-lit applications, comprising the steps of:

a) concurrently and coaxially extruding:

i.) a molten fluoropolymer through an annular channel of a coextrusion die to form an extruded tubular fluoropolymer cladding, and ii.) a crosslinkable core mixture through a core mixture delivery tube of the coextrusion die to form an extruded crosslinkable core mixture within the circumference of the extruded tubular fluoropolymer cladding;

b) filling the extruded tubular fluoropolymer cladding with the extruded crosslinkable core mixture; and c) curing the extruded crosslinkable core mixture within the extruded tubular fluoropolymer cladding wherein the cured extruded crosslinkable core mixture and the extruded tubular fluoropolymer cladding are in substantially complete contact, the improvement which comprises:

d) adding to the molten fluoropolymer, prior to feeding to the annular channel, from 50 to 4000 parts per million, preferably 200 to 2000 parts per million, of at least one light-scattering additive. Here the additive may be finely-divided, where finely-divided is defined as preferably from 0.1 to 10 microns, but it may also be larger in particle size, such as several millimeters in length. Preferably steps a), b), and c) are continuous.

Preferably the light-scattering additive when finely-divided is titanium dioxide, which may be treated, such as with a stearate salt, to improve dispersion, and preferably the titanium dioxide is of particle size from 0.2 to 0.5 microns. Calcium carbonate of similar particle size, but including preferred sizes of 8–10 microns, is also effective.

The core polymer may be any of those taught in the art, such as in U.S. Pat. No. 5,485,541, for light pipe or optical fiber uses, such as a poly(alkyl acrylate), poly(methyl methacrylate), a polyglutarimide, a silicone polymer, and the like. It will be transparent, preferably flexible, and preferably processable in melt form, then later cured or crosslinked to form the final core. However, by use of other manufacturing techniques such as filling cladding with monomer and polymerizing by a batch process, the need for delayed curability may be removed, although such processes are much harder to run in a continuous mode.

U.S. Pat. No. 5,485,541 also teaches many polymers other than fluoropolymers suitable for cladding of flexible light pipe or fibers; it is preferred for the present invention that the clad be of lower refractive index than the core, that the clad and the core bond at the surface in a uniform manner, and that the clad without additives be transparent. It is further preferred that the clad be readily co-extrudable with a co-extruded crosslinkable core.

Separately preferably, the crosslinkable core mixture comprises:

a) from about 90 to about 99.9 weight percent, based on the crosslinkable core mixture weight, of an uncrosslinked copolymer having weight average molecular weight from about 10,000 to about 150,000 daltons, the uncrosslinked copolymer comprising:

i) from about 80 to about 99.9 weight percent, based on the uncrosslinked copolymer weight, of polymerized units of a $C_1$–$C_{18}$ alkyl acrylate, a $C_1$–$C_{18}$ alkyl methacrylate, or mixtures thereof, ii) from about 0.1 to about 20 weight percent, preferably about 0.5 to about 12 weight percent, based on the uncrosslinked copolymer weight, of polymerized units of a functionally reactive monomer, preferably selected from 2-methacryloxyethyltrimethoxysilane, 3-methacryloxypropyltrimethoxysilane, 3-acryloxypropyltrimethoxysilane, vinyltrimethoxysilane, vinyltriethoxysilane, or mixtures of these, and iii) from 0 to about 10 weight percent, based on the uncrosslinked copolymer weight, of polymerized units of a refractive index increasing monomer selected from styrene, benzyl acrylate, benzyl methacrylate, phenylethyl acrylate or phenylethyl methacrylate; and b) from about 0.1 to about 10 weight percent, based on the crosslinkable core mixture weight, of a reactive additive, preferably water and a silane condensation reaction catalyst, which catalyst is preferably a dialkyltin dicarboxylate, such as dibutyltin diacetate and the like. This reactive additive combination may be present during the polymerization, added in part or wholly prior to the extrusion, or, in the case of water, added after the co-extrusion is complete, such as by diffusion through the cladding and jacketing during the cure process.

The process of our invention may further comprise the step of sheathing the extruded tubular cladding with a transparent sheathing polymer simultaneously with, or subsequently to, filling the extruded tubular cladding with the extruded crosslinkable core mixture. Our invention extends to a product with the capability of emitting light circumferentially, prepared by the process as defined above.

Our discovery further extends to a light pipe with the capability of emitting light circumferentially, comprising:

a) an extruded tubular fluoropolymer cladding containing from 50 to 4000 parts per million of at least one light-scattering additive;

b) a crosslinked core copolymer within the circumference of the extruded tubular fluoropolymer cladding, the crosslinked core copolymer comprising:

i) from about 80 to about 99.9 weight percent, based on the uncrosslinked copolymer weight, of polymerized units of a monomer selected from a $C_1$–$C_{18}$ alkyl acrylate, a $C_1$–$C_{18}$ alkyl methacrylate, or mixtures thereof, ii) from about 0.1 to about 20 weight percent, based on the uncrosslinked copolymer weight, of polymerized units of a functionally reactive monomer, iii) from 0 to about 10 weight percent, based on the uncrosslinked copolymer weight, of polymerized units of a refractive index increasing monomer selected from styrene, benzyl acrylate, benzyl methacrylate, phenylethyl acrylate or phenylethyl methacrylate; and iv) from about 0.1 to about 10 weight percent, based on the crosslinkable core mixture weight, of the reaction products of a reactive additive. Separate preferences within this discovery include wherein a) the functionally reactive monomer is used at a level of from about 0.5 to about 12 weight percent and is selected from 2-methacryloxyethyltrimethoxysilane, 3-methacryloxypropyltrimethoxysilane, 3-acryloxypropyltrimethoxysilane, vinyltrimethoxysilane, vinyltriethoxysilane, or mixtures of these;

b) the reactive additive is water and a silane condensation reaction catalyst, preferably a dialkyltin dicarboxylate; and c) the polymerized units of a monomer unit selected from a $C_1$–$C_{18}$ alkyl acrylate, a $C_1$–$C_{18}$ alkyl methacrylate, or mixtures thereof, are at least 80 weight percent of ethyl acrylate or butyl acrylate.

To obtain the optics for useful light pipe, a cladding is required with a refractive index lower than that of the core. Further, the cladding needs to be able to contain the core polymer effectively. Depending on the manufacturing process, the cladding may contain the monomers which are polymerized to form the core, the core polymer only partially polymerized, the core polymer polymerized but not crosslinked, and/or the fully crosslinked core polymer. Many cladding materials are known for this purpose, especially fluoropolymers which are of lower refractive index than most of the core polymers known to the art. Preferred compositions are wherein the fluoropolymer cladding is a terpolymer of perfluoroalkyl vinyl ether/tetrafluoroethylene/hexafluoro-propylene or a terpolymer of vinylidene fluoride/tetrafluoroethylene/hexafluoropropylene, an especially preferred embodiment being wherein the terpolymer cladding contains 50–55 weight percent vinylidene fluoride, 28–32 weight percent tetrafluoroethylene and 16–20 weight percent hexafluoropropylene, known as THV, and separately, wherein the transparent sheathing polymer is poly(vinyl chloride) or a transparent, non-crystalline polyolefin.

Small amounts of polytetrafluoroethylene may be added to FEP or THV to increase the crystalline content, which crystallites may add to the scattering of light without decreasing intensity. Also, careful control of the extrusion/process may give higher crystallinity and controlled scattering.

As noted, the at least one light-scattering additive produces the enhancement of the light diffusing through the cladding. The particle size of the additive when finely-divided is defined as from 0.1 to 10 microns, when glass fibers are used is below 5 mm. in length, and when hollow glass spheres are used is below 200 microns. The particles should be dispersible in the cladding polymer without excessive agglomeration, and the particles should not affect the physical properties of the clad adversely (such as the bonding of the clad to the core or toughness or tensile strength or flexibility of the core/clad combination). Apart from titanium dioxide, which is preferred, other particulate inorganic materials may be used, such as calcium carbonate, silica, talc, wollastonite, and the like. Organic polymer particles, especially those which are constrained by crosslinking from dissolving in the clad polymer, may also be used, such as those taught of particle size 2 to 8 microns in U.S. Pat. No. 5,237,004. Other organic polymers which may be used, if they meet the criteria described above, include core/shell impact modifiers, such as poly(butyl acrylate)/ poly(methyl methacrylate), ABS, or MBS polymers; hollow-core organic polymers used for opacifiers in coatings formulations; and suspension polymer beads. The level of particles, organic or inorganic, is preferably 50 to 4000 parts per million of cladding polymer.

A preferred mixture of light-scattering additives is a mixture of (a) from 500 to 3900 parts per million of titanium dioxide and/or calcium carbonate of particle size from 0.1 to 10 microns and (b) 100 to 3500 parts per million of glass fibers of length 5 mm. or less and/or hollow glass spheres of average particle size below 200 microns, the glass fibers or spheres being added to the molten fluoropolymer prior to feeding to the annular channel. This mixture gives a good appearing surface, and uniformity of the dispersion of light.

In the improved light pipe of the present invention, the light pipe consisting of the cladding and core polymers may be sheathed with a transparent sheathing polymer. The sheathing polymer is transparent, so that the light dispersed by the modified cladding can be conveyed to the outside of the composite light pipe. It may be colored or plasticized. For outdoor use, it may contain an ultraviolet stabilizer. It may contain a flame-retardant and/or a fungus-resistant agent, such as Kathon® biocide. Plasticized PVC (poly (vinyl chloride) is quite useful for this purpose, as it will accept UV stabilizers, and can be plasticized with an organophosphate as one means to add to its inherent flame resistance. Transparent polyolefin polymers which contain enough co-monomers to disrupt crystallinity are also useful for this purpose, even without plasticizers; they may require ultraviolet stabilizers and flame-retardants for use in certain environmental confines.

The core/clad material, especially when the cladding polymer is THV, may be sheathed with the transparent material just after or simultaneously with the core/clad co-extrusion, or it may be sheathed after cure. Because the THV is a soft cladding, it is generally preferred to sheath promptly to protect the THV and support the core/clad combination. However, if curing is to involve diffusion of water through the cladding, the presence of a sheath may slow the cure.

In the initial work described in U.S. Pat. No. 5,485,541, the curing for the alkoxysilane functionally reactive monomers is carried out by injecting water, an organotin catalyst, and a solvent for the catalyst after the polymerization is complete but prior to co-extrusion with the cladding. It has been found that a curable core may be prepared when the organotin catalyst and the solvent for the catalyst (but not water) are present during the polymerization, and then either there is addition of water just prior to the co-extrusion, or the curing reaction is conducted in the presence of ambient diffused water. The latter process can be accelerated to a practical level by using a humidified oven or by curing in a highly humid controlled atmosphere. The advantage to the separation of water from the other components until the polymerization and cladding are complete is that premature crosslinking does not occur, with subsequent undesirable effects on extrusion and on the surface interface between core and clad. Samples clad with THV can be externally cured at temperatures of 80° C. and 50% relative humidity, whilst samples clad with FEP can be cured at 85° C. and 85% relative humidity.

As noted above, we have further found that in addition to, or separately from, the at least one finely-divided light-scattering additive, certain forms of glass may be used effectively, when dispersed within the clad, to enhance the amount of side-lighting available. Chopped glass, such as Owens Corning 492AA, available in 0.125 inch length size (3.45 mm), may be dispersed with the $TiO_2$ in the THV formulation, to give a higher brilliance to the side-lit appearance, although the larger particles of glass give a slight appearance of internal irregularity to the cladding. When glass fiber alone is present, absent the smaller particulate material, the brightness is increased, but the appearance of the final light pipe is less attractive, due to irregularities in the light pattern observed. However, for back-lit applications, where the light pipe is not directly visible, the light pipe containing only the glass fibers or only the glass microspheres is quite effective in improving brilliance.

Smaller particles of fibers of glass, that is, below 5 mm. in length or diameter, are expected to be even more effective in increasing the brilliance. Such may include fumed silica, glass spheres, glass microspheres, glass hollow spheres, such as Scotchlite®™ hollow glass fibers of particle size ca. 50 microns, and the like.

Light pipes and FLPs are often coupled to high-flux illuminators, such as the GE Light Engine™, for conveying bright light to a desired use point (end-lit applications) or illumination or decoration utilizing the length of the light pipe (side-lit, side-emission or "neo-neon" applications). Other useful sources include, but are not limited to, direct solar light, focused solar light, fluorescent lamps, high-, medium- and low-pressure sodium lamps, quartz-halogen, tungsten-halogen and incandescent lamps.

Lamps may be used with rotating color filters, so as distribute different colored light to one or both ends of the light pipe, so as to produce a change of colors and fixed or variable time intervals. A single color may be supplied, if desired. Along with the advantage that such side-lit light pipes bring a brightness of illumination, especially to short segments (10 meters or less) of light pipe, it is their evenness of illumination and their ability to have colors altered which offer advantages over other means of delivering light to remote areas.

Many envisioned uses of light pipe do not require the enhanced side-lighting performance taught herein; indeed, many uses are most effective when there is no light leakage or sidelighting, and all of the light is conducted from the illumination source to the other end of the pipe to illuminate the target. Some specific uses for side-light optical pipe include: certain automotive and transportation uses, such as in certain interior decorative lighting of boats, trailers, campers and airplanes, and the like; certain retail lighting uses, such as in signs for replacement or enhancement of neon lighting systems, where the evenness of lighting from such system is desirable, as for back-lighting of signs; for safety guidance lines in dark areas, or for under-counter and cove lighting; to remote source systems, such as in hazardous environments, zoos, aquariums, art museums; for personal safety, such as in hiking, biking, in-line skating, scuba diving, and the like; for task lighting; for entertainment and display uses, especially where the ability to change color rapidly and continuously is important, such as in amusement parks, fountains, etc.; and for architectural uses, such as alcoves, atriums, staircases, and the like.

Other embodiments of the invention will be apparent to those skilled in the art from a consideration of this specification or practice of the invention disclosed herein. It is intended that the specification and examples be considered exemplary only, with the true scope and spirit of the invention indicated by the claims, following.

EXAMPLE 1
Preparation of Cladding Concentrates

It was found most efficient to make a concentrate of $TiO_2$ at about 1% by weight on fluoropolymer, and then dilute the concentrate with more fluoropolymer in a re-extrusion process to get to the level of light-scattering agent desired and to achieve the best dispersion of the light-scattering agent in the cladding polymer.

Several composites of THV-200G, a vinylidene fluoride 52/tetrafluoroethylene 30/hexafluoropropylene 18 terpolymer and $TiO_2$ were prepared on a 1" (25.4 mm.) Killion extruder, equipped with an 3:1 compression ratio, a single-stage screw operated at 24.9 rpm., a 0.25" (6.35 mm) single strand die, a water bath for cooling, and a pelletizer to chop the extruded strand into small pellets. All temperatures are reported in degrees F. (degrees C.). A screw with mixing pins at the last 25.4 mm. of the tip is found more efficient in dispersing the $TiO_2$. This mixing element is 1 inch (25.4 mm) in length, has 10 right-hand and 10 left-hand screw channels, a 1.5 inch (38.1 mm.) pitch, 0.0625 in. (1.58 mm) channel width and 0.750 in.(19 mm) root diameter.

The $TiO_2$ utilized in these blends had a particle size of 0.22 micron (220 nm) before and after processing. It has been "organically treated", probably with a stearate salt, to aid in dispersion.

The pellets were weighed into a 4.2 liter PE bag, and $TiO_2$ powder was added, the bag closed and shaken for 30 seconds to mix the powder evenly into the pellets. The pellet/powder blends were added to the extruder hopper in flood feed fashion. No vent tower or vacuum was used in this process. The molten strand was pulled via the pelletizer through a water bath, and chopped into pellets similar in size and shape to the starting material. The conditions shown below were for a similar fluoropolymer, THV-500G, which contains less vinylidene difluoride and more tetrafluoroethylene. Similar conditions, except for a higher screw speed (50 rpm) were employed for the THV-200G concentrates. For best strand consistency and mixing, about a 1% concentrate seems optimum.

TABLE 1

Processing of Fluorocarbon/Additive Concentrates

| Concentrate Sample # | 1-A (control) | 1-B | 1-C |
|---|---|---|---|
| % $TiO_2$ | 0 | 5 | 1 |
| Zone 1, Temperature | 330 (166) | 330 (166) | 329 (165) |
| Zone 2, Temperature | 376 (191) | 380 (193) | 380 (193) |
| Zone 3, Temperature | 417 (214) | 431 (222) | 430 (221) |
| Die, Temperature | 420 (216) | 418 (214) | 421 (217) |
| Melt, Temperature | 348 (176) | 352 (178) | 356 (180) |
| Torque, in-lbs (Newton-m) | 750 (85) | 250 (28.3) | 360 (40.8) |

To make these blends, the virgin THV-200G pellets were weighed in a 4.2 liter PE bag, then the composite was added in an amount needed to make the final ppm TiO2 content. Typically. 300g of a 1% $TiO_2$ blend in THV-200G and 2700 g of virgin THV-200 g to give an $TiO_2$ loading of 1000 ppm were weighed in 4.2 liter PE bags and shaken for 30 seconds to distribute the concentrate into the virgin pellets, prior to re-extrusion. The pellet/pellet blends were added to the extruder hopper in flood feed fashion. No vent tower or vacuum was used in this process. The molten parison was pulled via the belt puller through a brass sizing ring, through the water bath, and the tubing was collected in a coil fashion inside drums. In later experiments, a winding device was used to take up the tubing.

TABLE II

Processing of Fluorocarbon/Additive Concentrates

| Final Sample # | 1-D (control) | 1-E | 1-F |
|---|---|---|---|
| Concentrate | | 1-C | 1-C |
| final $TiO_2$, ppm | 0 | 200 | 1000 |
| Zone 1, Temperature | 320 (160) | 330 (166) | 349 (176) |
| Zone 2, Temperature | 375 (190) | 392 (202) | 399 (204) |
| Zone 3, Temperature | 430 (221) | 450 (232) | 460 (238) |
| Die 1, Temperature | 408 (209) | 410 (210) | 417 (214) |
| Die 2, Temperature | 410 (210) | 410 (210) | 416 (213) |
| Melt, Temperature | NA | NA | NA |
| Torque, in-lbs (joules) | 513 (65.9) | 520 (66.8) | 505 (64.9) |

Under similar conditions, preferably with the THV 200G polymer in the concentrate, blends were made using various UV stabilizers in combination with TiO2. Other light-scattering powders, such as $CaCO_3$, of particle size 8 to 10 microns, or an acrylic light-scattering polymer of ca. 5000 nanometers (5 microns) particle size described in U.S. Pat. No. 5,237,004 (incorporated herein by reference) and also chopped glass (Owens-Corning 492-EE) were similarly blended into composites to give final cladding mixes at 200 and 1000 ppm.

EXAMPLE 2
Test method Not Involving Continuous Co-extrusion

THV-200G was used to make hollow tubing of 7 mm. inner diameter, which was filled with the core material, after a PP jacket was fitted around the tubing to reinforce the rather soft hollow cladding.

EXAMPLE 3
Confirmation of Optimum Level of $TiO_2$

Thin films were prepared for measurement of light transmission/haze vs. $TiO_2$ level by extrusion through a 1 inch (25.4 mm) Killion extruder at 37.3 rpm, with a screw with mixing pins and a sheet die set to 0.03 inches (0.762 mm.) The melt temperature was 408° F. (209° C.). Readings were: Zone 1: 345–350° F. (174–177° C.); Zone 2: 364° F. (184° C.); Zone 3: 380° F. (193° C.); Dies 1 and 2: 410° F. (210° C.); die pressure 740–820 psi. (5650 kPa). The data show that at the additive level of choice, the amount of total white light was not significantly lowered, whilst at levels suggested in the prior art, the cladding allows little of the light to pass.

TABLE III

Total White Light and Transmission and Haze Values for Various Loadings of $TiO_2$ in THV Film

| Wt. % $TiO_2$ in THV/$TiO_2$ blend | TWLT, % | Haze, % |
|---|---|---|
| 0 (control) | 96.0 | 1.4 |
| 0.01% (1000 ppm) | 88.6 | 26.1 |
| 0.1% (10,000 ppm) | 56.4 | 90.9 |
| 1.0 | 15.3 | 100 |
| 2.0 | 9.28 | 98.2 |
| 5.0 | 3.16 | 99.8 |
| 10.0 | 0.27 | 95.3 |

EXAMPLE 4

Comparison with Unfilled Cladding and with Commercial Materials

Samples of two commercial light pipes were compared with the core material described above, when variously clad with non-filled THV, with THV at two levels of $TiO_2$, and with a FEP clad. These samples were made by the tube-filling process of Example 3, as more fully described in U.S. Pat. No. 5,485,541. The diameters noted in the Table are inside diameters. In terms of light measurements, it can be seen that the addition of 200 ppm $TiO_2$ produces light values approximately those of commercial sample A, whilst the sample with 1000 ppm $TiO_2$ is equivalent to commercial sample B.

In terms of color, however, the commercial sample B (Lumenyte 2000WN400, believed to be a core/clad combination) was clearly more white as measured by the Chroma meter CL-100, the commercial sample A (Polymer Optics, composition unknown) was yellow/white, and the present samples more yellow, which yellowness is diminished by the presence of the TiO2 additive.

The measurements were made using a Fiber Optics Technology Illuminator, equipped with a 150-watt metal halide high intensity discharge lamp, A Minolta Chroma Meter CL-100 was used to measure the light and the color emitted from the sides of these samples. The CL-100 is a tristimulus color analyzer. The Chroma meter utilizes three high sensitivity photocells to match CUE (Commission Internationale de I'Ectairage) Standard Observer response. These cells make simultaneous readings of the light source through an integrating diffuser. The readings are processed by a built-in microcomputer and displayed digitally on a LCD.

TABLE IV

Intensity Measurement at Various Distances of Core/Clad Samples (7 mm.) with Titanium Dioxide in 0.5 mm. Cladding and with Commercial Side-Lit Light Pipe

| | Ex. 4-A | Ex. 4-B | Ex. 4-C | Ex. 4-D | Comm. Product A | Comm. Product B |
|---|---|---|---|---|---|---|
| Diameter, mm. (of core) | 7 | 7 | 7 | 7 | 13 | 8.8 |
| Cladding | THV | THV | THV | FEP | FEP?? | Unknown |
| Additive ($TiO_2$) | None | 200 ppm | 1000 ppm | None | Unknown | Unknown |
| Distance from light source, in (mm). | | | | | | |
| 1 (25.4) | 168 | 152 | 385 | 170 | 304 | 242 |
| 2 (50.8) | 93.8 | 105 | 355 | 109 | 130 | 217 |
| 4 (101.6) | 92.4 | 97.5 | 257 | 83.8 | 106 | 228 |
| 8 (203.2) | 78.5 | 116 | 185 | 57.6 | 96.2 | 185 |

EXAMPLE 5

Preparation of Core/Clad Samples

Monomer mixes are prepared as follows: To a 19 liter 316 stainless steel vessel were added and mixed 9500 g of ethyl acrylate, 500 grams of the functionally reactive monomer, 3-methacryloxypropyltrimethoxysilane (MATS) (5 wt. % based on monomer weight (b.o.m.), 6.4 g. of initiator (recrystallized 2,2'-azobis(2-methylbutyronitrile) (0.064 wt. %) and 100 g. of n-dodecyl mercaptan (1 wt. %). The mixture was sparged for at least 15 minutes with nitrogen and degassed under 28 inches (711 mm.) vacuum as it was pumped into the reactor.

The monomer mix was fed through a 0.045 micron PTFE membrane cartridge filter to a 2000 ml stainless steel constant flow stirred tank reactor (CFSTR). During polymerization, flow rates for the 2000 ml CFSTR are ca. 70 g/min. to produce a 28-minute residence time. The CFSTR was equipped with multiple (6) blade 45° pitch turbine agitators. During polymerization, the reactors are held at 125° C., and agitated at 225 rpm under a pressure of 1035 kPa (150 psi). Reactor effluent (copolymer and residual monomer) was fed through a back-pressure valve set nominally at 1035 kPa (150 psi) into a devolatilization column comprising a stainless steel twisted-tape motionless mixer (60 cm. in length with a jacket of about 50 cm length) mounted on an 39-liter (ca. 9-gallon) stainless steel catchpot. Heating oil recirculated through the column jacket was held at 200° C. at the jacket inlet. The catch-pot was held at 100–110° C. and ca. 300–400 mm. of vacuum during devolatilization. Upon completion of the polymerization, the catch-pot was back-filled with filtered nitrogen.

The monomer-to-polymer conversion of the reactor effluent was approximately 87–88%, as measured gravimetrically. Gravimetrically determined solids content of the devolatilized polymer typically is 99.5 wt.

It should be noted that in later runs found in Examples 11 and 12, conditions were changed as follows: 2.08 grams of 2,2'-azobis(2,4-dimethylvaleronitrile); 150 grams n-dodecyl mercaptan; reaction temperature 95° C.; 90 grams/min. feed rate; 22.2 minute residence time; 79–80% conversion prior to devolatilization.

The crosslinkable core mixture was conveyed to a coextrusion die by any of several known means such as a screw pump, gear pump, piston pump, or other such pressure generating device capable of delivering a smooth, pulseless, continuous flow. Gear pumps and piston pumps are preferable as they minimize the potential for particulate contamination of the crosslinkable core mixture due to mechanical wear. Example 28 of U.S. Pat. No. 5,485,541 is illustrative of the preparation and conveyance of a preferred crosslinkable core mixture.

EXAMPLE 6
Continuous Production of Core/Clad Samples

A flexible light pipe was prepared essentially by the method of Example #28 of U.S. Pat. No. 5,485,541; a line speed of 6–8 ft./min. (183–244 cm./min.) was utilized. The core diameter was 7 mm. and the cladding thickness 0.5 mm.

The clad light pipe was processed on machinery typical of a wire coating operation; the pipe was unwound from a reel and passed through a crosshead die where the sheathing compound was applied from the melt. The crosshead die was attached to a small (25.4 mm.) single screw extruder. The tip of the pressure type tooling to apply the coating had an inside diameter of 6.0 mm. The die had an inner diameter of 8.0 mm. with a 6 mm. land. The dimensions of the die tooling determine the thickness of the sheathing. In the present example, the sheathing or jacketing was 1 mm. thick.

After sheathing, the sheathed light pipe was quenched in a conventional horizontal cooling trough. The sheathed light pipe was produced at a line speed of 8–10 feet (2.4 to 3 meters)/minute, with a belt puller used to maintain line speed. The outside diameter of the product was measured with a dual axis laser gauge.

Extrusion conditions for the sheathing were: barrel zone 1=380° F. (193° C.); barrel zone 2=395° F. (202° C.); barrel zone 3=435° F. (224° C.); die 450° F. (23220 C.); screw speed 35 rpm; die pressure 890–1050 psig (6132–7235 kPa).

EXAMPLE 7
Intensity of Side-Lit Samples

This example describes relative intensity of side-light light pipe. Continuous runs were made of the flexible light pipe core described above, with cladding based on THV with no additive (Example VI-1, two separate runs), with 1000 ppm of $TiO_2$ (Example VI-2, two separate runs), and with 1000 ppm of 3.18 mm. chopped glass fibers (Example VI-3). Thickness was 7.0 mm inner diameter and 0.5 mm clad. No sheathing was applied. Contrast is made with commercial sample A described above; the standard was another commercial sample C, (Fiberstars), which is described as bundled poly(methyl methacrylate) fibers.

Measurements of the relative intensity were made at distances of 2 feet (0.61 meters) and 3 feet (0.93 meters) from the light source. A Dolan Jenner Fiber-Lite Illuminator with a flexible arm is the light source with the side arm placed to deliver the light to one end of the flexible light pipe. It uses a 30 W QTH type A bulb and provides " high intensity cold light, i.e., that the infra-red radiation has been filtered out. The pipe was passed through an integrating sphere and the intensity measured.

TABLE V

Relative Intensity of Side-Lighting from Various Light Pipes

| Sample | Ex. VI-1 | Ex. VI-2 | Ex. VI-3 | Comparative C | Comparative A |
|---|---|---|---|---|---|
| Distance | | | | | |
| 0.63 m. | 155, 125 | 700, 560 | 1750 | 100 | 190 |
| 0.96 m | 130, 120 | 500, 510 | 1100 | 70 | 170 |

EXAMPLE 8
Intensity of Side-Lit Samples with Organic Particles

Organic polymer particles, constrained by crosslinking from dissolving in the cladding polymer, which particles have a poly(butyl acrylate) core and a poly(methyl methacrylate) shell, were prepared in 5 micron particle size by Example 8 of U.S. Pat. No. 5,237,004. They were evaluated as in Examples 6 and 7; the level of the particles were 200 ppm (Example VIII-2) and 1000 ppm. (Example VIII-3). Example VIII-1 has no particulate additive. The results demonstrate improvements in illumination, but these particles were not as effective as the $TiO_2$ used in the earlier examples.

TABLE VI

Use of an Organic Particle to Enhance Brilliance

| Sample | Ex. VIII-1 | Ex. VIII-2 | Ex. VIII-3 |
|---|---|---|---|
| Distance | | | |
| 0.63 m. | 155 | 260 | 400 |
| 0.96 m | 130 | 220 | 375 |

EXAMPLE 9
Intensity of Side-Lit Samples with Other Inorganic Additives

The following were evaluated in a manner similar to those described in Examples 6 and 7.

TABLE VII

Relative Intensity of Side-Lighting from Various Light Pipes with Other Additives

| Sample | Ex. VI-1 | Ex. IX-2 | Ex. IX-3 | Ex. IX-4 | Ex. IX-5 |
|---|---|---|---|---|---|
| Particulate | clear-none | 200 ppm. glass fiber | 200 ppm. $CaCO_3$ | 1000 ppm. $CaCO_3$ | 200 ppm. $TiO_2$ |
| Distance | | | | | |
| 0.63 m. | 155, 125 | 650 | 280 | 450 | 440 |
| 0.96 m | 130, 120 | 540 | 230 | 360 | 400 |

EXAMPLE 10
Intensity of Side-Lit Samples with Glass Spheres

Core/clad combinations were prepared as in Examples 6 and 7, but with 200, 500 or 1000 ppm of Scotchlite™ glass bubbles (Examples X-1 to X-3). The bubbles are labeled K-46, where 100% of the bubbles pass a 125 micron screen and 50% a 50 micron screen. These hollow microspheres can survive the extrusion process to form the cladding with only limited crushing.

With no $TiO_2$ present, the appearance of the light pipe from Examples X-1 to X-3 optically was similar to, but better than, a sample with 1000 ppm of $TiO_2$ alone, but there was a rougher feel to the light pipe. 200, 500 ppm or 1000 ppm of the bubbles may be used with 1000 ppm of $TiO_2$ (Examples X-4 to X-6) to prepare a sample with excellent illuminating quality and smoother surface.

TABLE VIII

Relative Intensity of Side-Lighting with Glass Microspheres as an Additive

| Sample | Ex. VI-1 (no additive) | Ex. X-1 | Ex. X-2 | Ex. X-3 | Ex. X-4 | Ex. X-5 | Ex. X-6 |
|---|---|---|---|---|---|---|---|
| Distance | | | | | | | |
| 0.63 m. | 155, 125 | 580 | 1070 | 1450 | 1350 | 1520 | 1870 |
| 0.96 m | 130, 120 | 490 | 710 | 1070 | 1050 | 1140 | 1530 |

EXAMPLE 11

Intensity of Side-Lit Samples with Transparent Sheathing

These samples were polymerized by the revised process described in Example 6. A jacket was applied as described previously; Jacket PVC-1 was a clear PVC known only as PVC 5376FFR; Jacket PVC-2 was a Geon PVC; Jacket PO-1 was a clear polyolefin known only as Engage 8480; Jacket PO-2 was a second clear polyolefin known only as Engage 8150. Two values mean two separate preparations and measurements.

TABLE IX

Relative Intensity of Jacketed Side-Lighting

| Sample | Ex. XI-1 | Ex. XI-2 | Ex. XI-3 | Ex. XI-4 | Ex. XI-5 | Ex. XI-6 | Ex. XI-7 |
|---|---|---|---|---|---|---|---|
| Particulate | clear–none | 1000 ppm, $TiO_2$ | clear–none | 1000 ppm, $TiO_2$ and 500 ppm glass strands | 1000 ppm, $TiO_2$ | 1000 ppm, $TiO_2$ | 1000 ppm, $TiO_2$ and 500 ppm glass strands |
| Jacket | PVC-1 | PVC-1 | PVC-2 | PVC-2 | PO-1 | PO-2 | PO-1 |
| Distance | | | | | | | |
| 0.63 m. | 105, 80 | 410, 380 | 140 | 1750 | 650 | 730 | 1770 |
| 0.96 m | 60, 70 | 330, 330 | 130 | 1030 | 440 | 680 | 1050 |

EXAMPLE 12

Intensity of Side-Lit Samples with FEP Sheathing

In a manner similar to the above examples, a core/clad combination with FEP cladding and no additives (Example XII-1) was compared with a FEP cladding which contained a level of $TiO_2$ less than 1000 ppm but above 200 ppm. (This latter sample was taken during a transition period, and it is believed not all the clear FEP had been purged prior to the cladding with the FEP charged with 1000 ppm as being the only material extruded).

TABLE X

Use of FEP Cladding with $TiO_2$ Additive

| Sample | Ex. VIII-1 (clear THV clad) | Ex. XII-1 (clear FEP clad) | Ex. XII-2 (FEP/$TiO_2$ clad) |
|---|---|---|---|
| Distance | | | |
| 0.63 m. | 155 | 120 | 610 |
| 0.96 m | 130 | NA | 560 |

EXAMPLE XIII

Preparation of Jacketed Side-Lit FLP with Glass Microspheres

In a manner similar to Example XI with PVC-1 cladding and with a THV sheathing, samples were prepared as in Example X, and similar results were obtained.

TABLE XI

Relative Intensity of Side-Lighting with Glass Microspheres as an Additive

| Sample | Ex. XIII-control | Ex. XIII-TiO$_2$ | Ex. XIII-1 | Ex. XIII-2 | Ex. XIII-3 | Ex. XIII-4 | Ex. XIII-5 | Ex. XIII-6 |
|---|---|---|---|---|---|---|---|---|
| Distance | no additive | 1000 ppm TiO$_2$ no glass | 200 ppm microspheres | 500 ppm microspheres | 1000 ppm microspheres | 200 ppm microspheres and 1000 ppm TiO$_2$ | 500 ppm microspheres and 1000 ppm TiO$_2$ | 1000 ppm microspheres and 1000 ppm TiO$_2$ |
| 0.63 m. | 170 | 540 | 390 | 560 | 1240 | 970 | 1080 | 1640 |
| 0.96 m | 140 | 490 | 350 | 510 | 1010 | 910 | 950 | 1210 |

We claim:

1. A light pipe with the capability of emitting light circumferentially, comprising:
   a) an extruded tubular fluoropolymer cladding containing from 50 to 4000 parts per million of at least one light-scattering additive, and
   b) a transparent core within the circumference of the extruded tubular fluoropolymer cladding, the core having a refractive index higher than that of the fluoropolymer cladding.

2. The light pipe of claim 1 wherein the at least one light scattering additive is titanium dioxide or calcium carbonate of particle size from 0.1 to 10 microns.

3. The light pipe of claim 1 wherein the at least one light scattering additive is glass fibers of length 5 mm. or less or hollow glass spheres of average particle size below 200 microns.

4. The light pipe of claim 1 wherein the at least one light scattering additive is a mixture of (a) from 500 to 3900 parts per million of titanium dioxide and/or calcium carbonate of particle size from 0.1 to 10 microns and (B) 100 to 3500 parts per million of glass fibers of length 5 mm. or less and/or hollow glass spheres of average particle size below 200 microns.

5. The light pipe of claim 1 wherein the fluoropolymer cladding is a terpolymer of perfluoroalkyl vinyl ether/tetrafluoroethylene/hexafluoropropylene or a terpolymer of vinylidene fluoride/tetrafluoroethylene/hexafluoropropylene.

6. The light pipe of claim 1 wherein the transparent core is a crosslinked polymer.

7. The light pipe of claim 1 wherein the transparent core consists substantially of crosslinked polymerized units of monomers selected from C1–C18 alkyl acrylates, or C1–C18 alkyl methacrylates, or mixtures thereof.

8. The light pipe of claim 1 wherein further the cladding and core polymers are sheathed with a transparent sheathing polymer.

* * * * *